US009838266B2

(12) United States Patent
Bruins et al.

(10) Patent No.: US 9,838,266 B2
(45) Date of Patent: Dec. 5, 2017

(54) DYNAMIC DEVICE COLLABORATION

(71) Applicant: Apple Inc., Cupertino, CA (US)

(72) Inventors: Jay N. Bruins, Los Altos, CA (US);
Leonardo A. Soto Matamala, Los Altos, CA (US); Ronald K. Huang, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/768,607

(22) Filed: Feb. 15, 2013

(65) Prior Publication Data

US 2014/0237015 A1 Aug. 21, 2014

(51) Int. Cl.
*H04L 12/24* (2006.01)
*H04W 52/02* (2009.01)
*H04M 1/725* (2006.01)

(52) U.S. Cl.
CPC ......... *H04L 41/26* (2013.01); *H04W 52/0209* (2013.01); *H04M 1/7253* (2013.01); *H04W 52/0219* (2013.01); *H04W 52/0261* (2013.01); *Y02B 60/50* (2013.01)

(58) Field of Classification Search
CPC ....... H04W 28/0205–28/0294; H04W 28/021; H04W 28/16–28/26; H04W 40/02–40/22
USPC .......................................................... 709/201
See application file for complete search history.

(56) References Cited

U.S. PATENT DOCUMENTS

| 5,954,797 | A | * | 9/1999 | Sidey | ................... H04L 12/24 709/223 |
| 6,317,425 | B1 | | 11/2001 | Kim | |
| 6,842,434 | B1 | | 1/2005 | Cook | |
| 7,024,196 | B1 | * | 4/2006 | Kotzin | ........................... 455/445 |
| 2006/0020694 | A1 | * | 1/2006 | Nag | ................. H04L 29/06027 709/223 |
| 2008/0141146 | A1 | * | 6/2008 | Jones et al. | ................... 715/753 |
| 2008/0192666 | A1 | * | 8/2008 | Koskan et al. | ............... 370/311 |
| 2011/0010258 | A1 | * | 1/2011 | Chavez | ............. G06Q 30/0283 705/26.1 |

(Continued)

OTHER PUBLICATIONS

International Search Report and Written Opinion for International PCT Application No. PCT/US2014/014947, dated May 20, 2014, 6 pages.

(Continued)

*Primary Examiner* — Tonia L Dollinger
*Assistant Examiner* — Albert Chiou
(74) *Attorney, Agent, or Firm* — Kilpatrick Townsend and Stockton LLP

(57) ABSTRACT

Using various functionalities of electronic devices such as applications that gather location information to provide a service to the user can come at the cost of significant power consumption, and consequently battery drainage. A data sharing system enables the creation of a network of participant devices where participant devices in the network can take turns in collecting and sharing data with the rest of the participant devices in the network. The one or more participant devices can share the obtained data through Bluetooth® low energy (BTLE) or other low consumption channel, so that the ensemble of participant devices could have better battery life, higher availability, and/or better accuracy, compared to each device having to individually obtain the data.

23 Claims, 6 Drawing Sheets

(56) References Cited

U.S. PATENT DOCUMENTS

2012/0072971 A1   3/2012  Zhang et al.
2012/0311165 A1   12/2012 Renschler et al.

OTHER PUBLICATIONS

International Preliminary Report on Patentability for International PCT Application No. PCT/US2014/014947, dated Aug. 27, 2015, 5 pages.

* cited by examiner

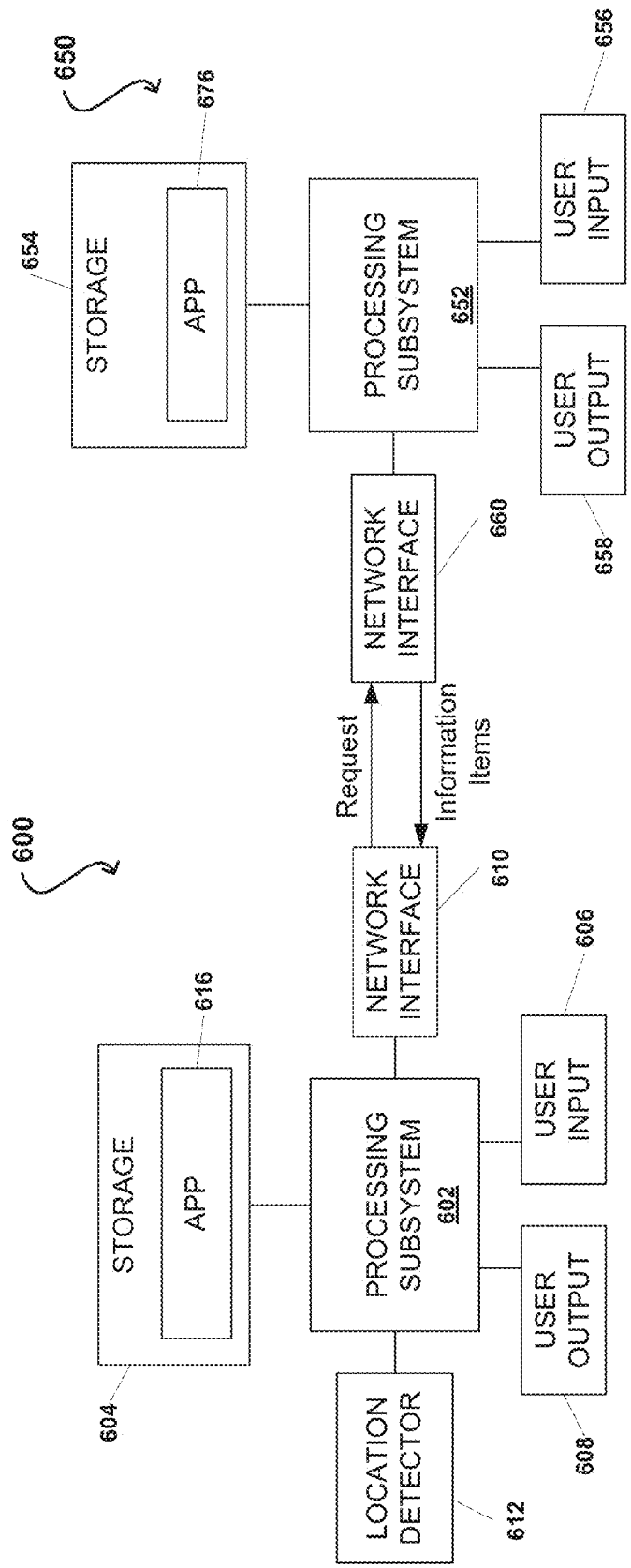

DYNAMIC DEVICE COLLABORATION

BACKGROUND

People are using portable electronic devices for an increasing number and variety of tasks. For example, a smartphone can provide a wide array of services based on a user's location, such as available restaurants within the vicinity or real-time guided directions to a destination. As various portable electronic devices have increasingly enhanced functionalities, the amount of resources and power consumption required by these devices tend to increase. The reliance on various functionalities often causes battery drainage before another power recharging opportunity comes up.

Often, users may want to retrieve information regarding a current status, such as a current location, a current time, or a current weather condition. In many instances, multiple users will utilize certain functionality that are similar to those around him, such as a retrieval of a current location, time or weather condition. Allowing the users to individually retrieve the information can lead to unnecessary drain on the power, as well as potentially other resources such as processing capacity and bandwidth. Not only do some devices not possess the hardware capabilities to obtain the desired information, requiring those devices that have such capabilities to retrieve the information on a periodic basis can be costly in terms of power consumption. Thus, there is a need for devices to retain sufficient power such that users may utilize the devices as necessary and also a need to be able to conserve power on the devices.

BRIEF DESCRIPTION OF THE DRAWINGS

FIG. 6A is a simplified block diagram of an implementation of a device according to some embodiments.

FIG. 6B is a simplified block diagram of an implementation of data sharing server according to some embodiments.

DETAILED DESCRIPTION

Figure 1:
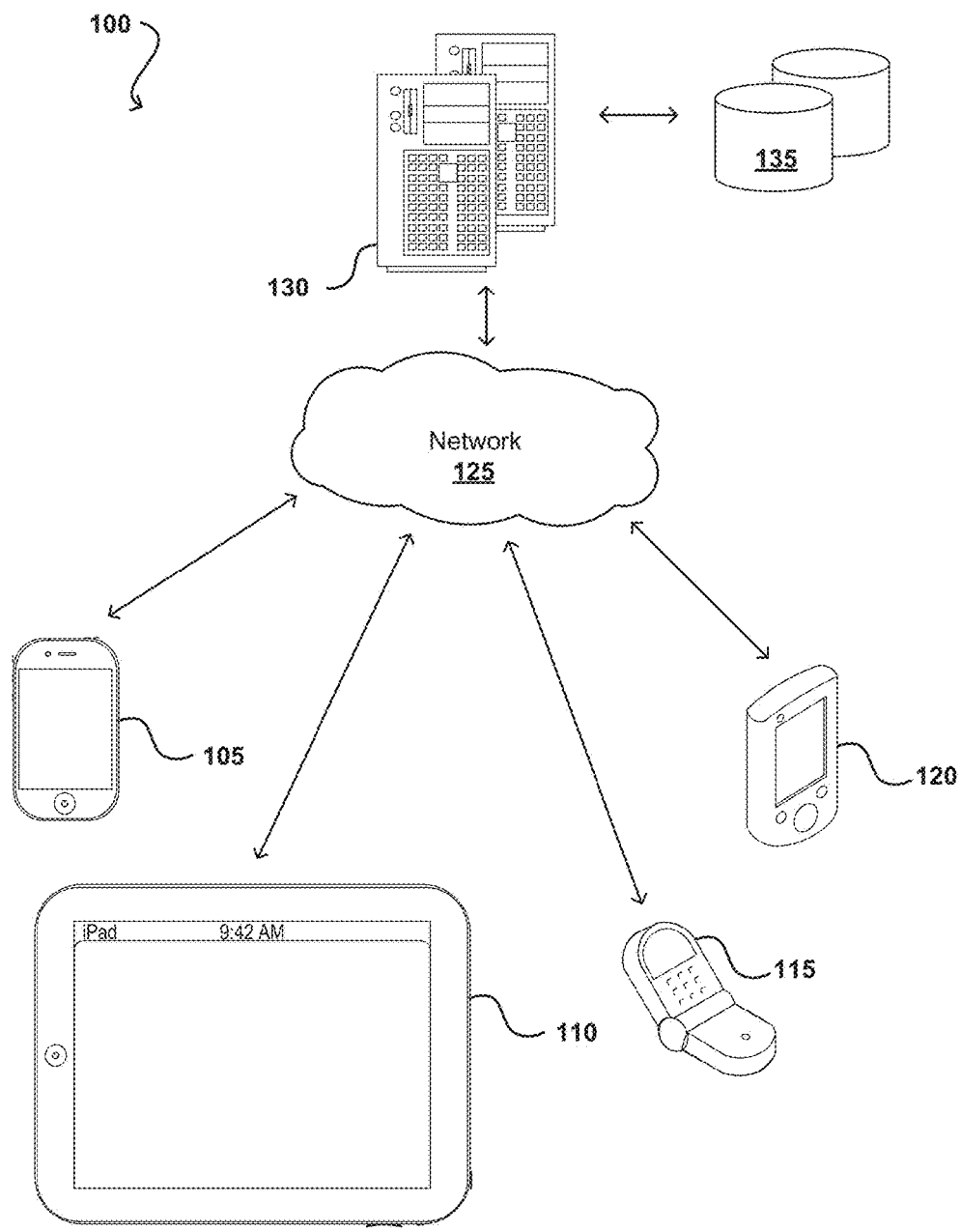
FIG. 1 illustrates an example of a data sharing system according to some embodiments of the invention.

Aspects of the disclosure relate to creation of a data sharing network for at least two portable electronic devices and establishing a data retrieval and sharing pattern among the devices. In instances where two or more persons within a close distance of each other are using location services (e.g., a map application), the location information can be obtained and shared by one of the devices so as to conserve the total power consumption across the devices. The devices can share the location information through Bluetooth® low energy (BTLE or Bluetooth® 4.0) or other low consumption channel so that the devices can maintain an overall higher power level, higher availability of the devices, and/or better accuracy, compared to the instance where each device performs the location determination.

An electronic device in some embodiments can identify one or more devices to be part of a local network for sharing one or more predetermined information items. The one or more predetermined information items can be information that may be obtained periodically by a device, such as a current time, a current location, a weather condition, etc. The one or more information items can be obtained from an external source, such as a remote server that has access to one or more databases. The electronic device can determine a sharing pattern for the local network. In some embodiments, the sharing pattern can designate the device to obtain and share the one or more predetermined information items with the other devices in the local network for a period of time. The sharing pattern can further designate another device to obtain and share the one or more predetermined information items with the other devices in the local network when a set of criteria has been satisfied. The electronic device can receive, based on the sharing pattern, an indication to obtain the one or more predetermined information items for the devices for the period of time. In some embodiments, the electronic device can then distribute the one or more predetermined information items to the other devices.

In some embodiments, the one or more predetermined information items can be pieces of information that may be meaningful when obtained on a periodic basis. For example, a device may scan for a frequency that has a good signal (e.g., a connection frequency) and distribute this information to other devices. In another example, a device may determine a current location of the device and send the location information to devices within the vicinity. The obtained information may serve to be useful for devices within the vicinity. Further, the information being meaningful while obtained on a periodic basis may permit the switch off on the device that performs the data obtaining. For instance, it may not be useful for the information item to be streaming media where it would be difficult for devices to rotate in obtaining the data and distributing to the other devices in a shared session.

As described, upon designating a number of devices to be part of the data sharing network, an electronic device can determine a sharing pattern for the devices. The sharing pattern can designate the one or more devices that would be obtaining the data, the criteria that would be used to identify the one or more devices, the order in which the identified devices would be obtaining the data, the type of data that will be obtained and distributed, how long each device would be obtaining the data and distributing the data, etc. After the sharing pattern is determined, a device (e.g., designated by the sharing pattern to be the first device) can obtain the predetermined type of information (e.g., a local weather, a current location, a frequency at which signal can be received) and distribute the information by transmitting through a low power consumption channel (e.g., BTLE) to the various other devices. Based on the sharing pattern, different devices may subsequently be designated to obtain the predetermined type of information and distribute the obtained information to the other devices.

In many cases, the devices also can communicate information using what is referred to herein as a "sideband channel," which typically is a wireless communication mechanism including technologies such as Bluetooth®, radio frequency (RF) transmissions, IR signaling, Wi-Fi, and/or other such communication technologies. Some embodiments can use ultra-wideband (UWB) radio technology, which enables communication over a large range of the radio spectrum with very low energy consumption for short-range high-bandwidth communications, In addition to high bandwidth capability, UWB also has high immunity to other RF signals (e.g., Wi-Fi, Bluetooth), and enables extremely tight time synchronization. Further, in some embodiments, the communication devices are not limited to mobile telephones, but may also be applicable to other portable devices such as portable laptops, tablet computers, smartphones, etc.

Various embodiments will now be discussed in greater detail with reference to the accompanying figures, beginning with FIG. 1.

I. System Overview

FIG. 1 illustrates an example of a data sharing system 100 according to some embodiments of the invention. As shown, data sharing system 100 can include several electronic client devices 105-120, which can include any appropriate device operable to send and receive requests, messages or information over an appropriate network 125 and convey information back to a user of the device. Examples of such client devices include personal computers, cell phones, laptop computers, personal data assistants, smartphones, tablet computers and the like. In the example of FIG. 1, electronic client device 105 is illustrated as a smartphone, device 110 is illustrated as a tablet computer, device 115 is illustrated as a mobile phone, and device 120 is illustrated as a data-enabled cellular phone, each with various communication capabilities.

Network 125 can include one or more network portions for communicating data and other signaling, including one or more private network portions, one or more public network portions, or a combination thereof. Communication over communications network 125 can be enabled via wired or wireless connections and combinations thereof. The wired network can include the Internet, a private Internet-Protocol (IP)-based network, etc. and the wireless network can include a cellular network, a wireless local area network (MAN), the Internet, and the like. In this example, network 125 includes the Internet, the cellular network, and a Bluetooth® network. Client devices 105-120 can be connected to network 125 through mobile telephone networks and/or basestations.

System 100 further includes a Web server for receiving requests and serving content in response thereto. Other devices for receiving requests and serving content can be provided, as would be apparent to one of ordinary skill in the art. System 100 also includes an application server and a data store. The term "data store" can refer to any device or combination of devices capable of storing, accessing and retrieving data, which may include any combination and number of data servers, databases, data storage devices and data storage media, in any standard, distributed, or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

In the example illustrated in FIG. 1, one or more of client devices 105-120 can initiate a sharing session among the devices such that resources of and accessible to the client devices 105-120 can be fully utilized. For example, a sharing session can be initiated such that the client device with the highest battery level can be used to obtain the desired information from the server. The client device can then send the information to the other devices via a low power consumption channel, thereby conserving the overall power used by the group of devices.

Figure 3:
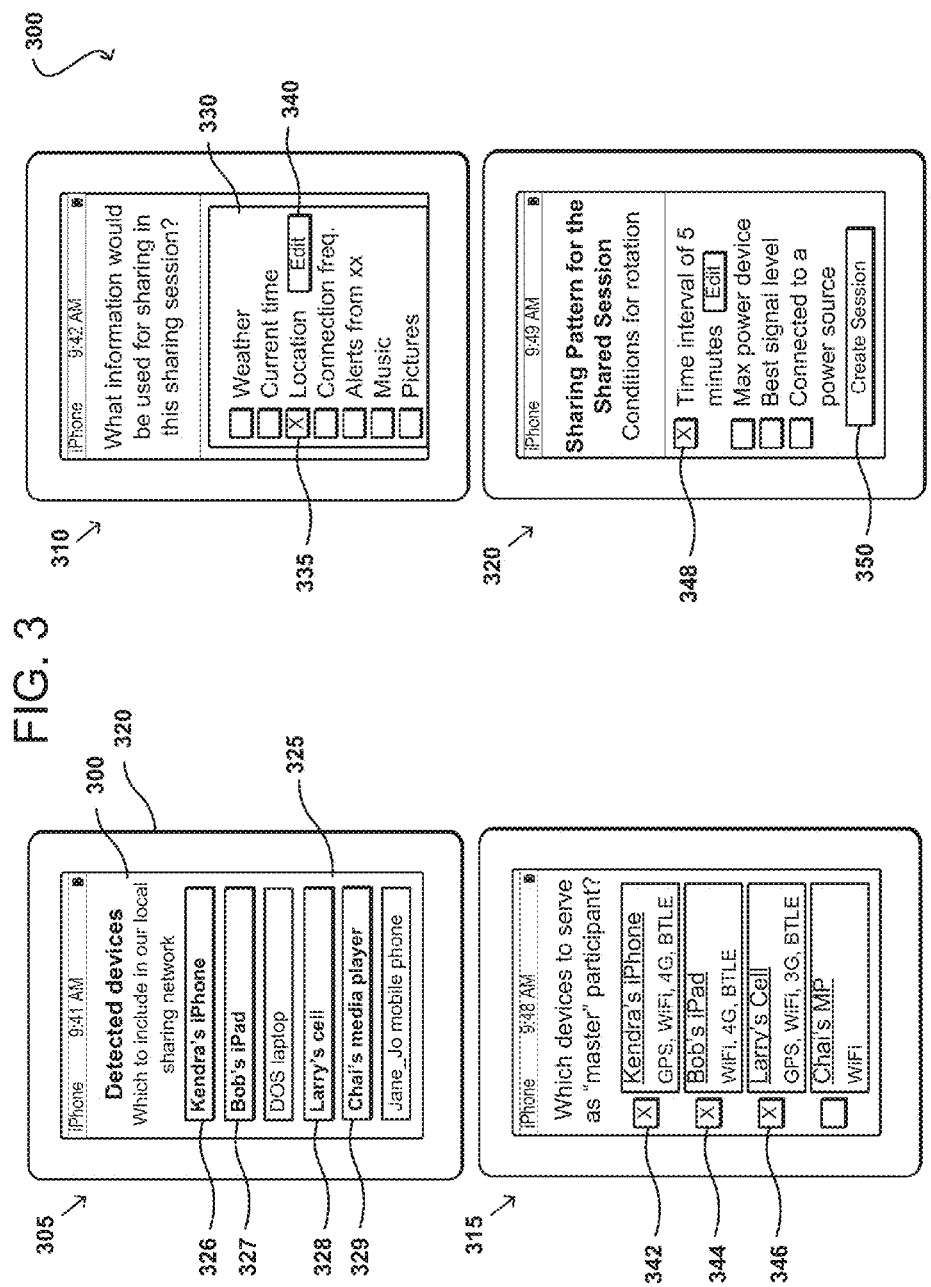
FIG. 3 illustrates an example of a setup and initiation sequence of a data sharing session through a user interface provided by a data sharing application in accordance with some embodiments.

In some embodiments, the sharing session can be initiated via an application or a service accessible via one of client devices 105-120. The application or service can provide a user interface (as illustrated in FIG. 3) enabling a user of client devices 105-120 to identify one or more devices to be included in the sharing session. The application or service may also enable the user to select a type of network, such as a low consumption channel, via which the sharing session can be conducted. In some embodiments, a channel may be selected based on the communication capabilities of devices 105-120. A device in some embodiments may select a default channel as configured by a user or an administrator. In this example, the network selected for the sharing session is a Bluetooth® network.

The application or service may enable the user to identify one or more information items to be shared among the group of user devices during the sharing session. In some embodiments, the one or more information items can include one or more of a current time, a current location, a weather condition, a frequency/channel, or any such information items that can be consistent for users who are within a distance range of each other. As such, instead of requiring each device to request the same information, system 100 enables the devices to obtain the same information while only requiring one of the devices to request the information via networks that would cause the device to incur significant energy loss (e.g., 3G or GSM networks). In some embodiments, the one or more information items are "predetermined" or identified prior to commencement of the sharing session.

In some embodiments, a sharing pattern can be determined for the sharing session. One or more of devices 105-120 can determine the sharing pattern via e.g., the user interface provided by the application or service. The sharing pattern can specify which device is to obtain the predetermined information items and at what intervals. The sharing pattern can be one in which the devices take turns in obtaining information via the high power consumption network (e.g., 3G network, GSM network, Wi-Fi network) and sharing information with the other devices in the group via the low power consumption network (e.g., Bluetooth®). In some embodiments, the sharing pattern can be dynamically determined and specified by a set of criteria or conditions to be satisfied. For example, the relative power level of the devices can be determined and the device with the highest power level may be selected to be the device that obtains and distributes the information.

After the sharing pattern has been determined, the device (e.g., device 105) designated to be the device that obtains and distributes the information can begin sending requests to the server 130 (e.g., data sharing server, Web server, app server) via network 125 and obtain the predetermined information items (e.g., a current location and guided directions to a destination) e.g., from storage memory (e.g., database 135). Upon obtaining the predetermined information item(s), device 105 can distribute the information item(s) to one or more of the other devices in the group, such as devices 110-120, The information item(s) can be distributed via a low power consumption channel. As mentioned, device 105 can distribute the information item(s) via the Bluetooth® network, as specified in the sharing pattern. The other devices within the sharing session may then provide the same location and direction information on their devices while conserving energy loss on the devices.

The sharing pattern in some embodiments designates a period of time in which each device may serve as the "host" device, which is the device that obtains and distributes the predetermined information items. For example, the sharing pattern in FIG. 1 may designate that device 105 serves as the "host" device for a period of time. The sharing pattern may further designate that upon expiry of the period of time, another device (e.g., device 115) is designated to obtain and distribute the information item.

In some embodiments, the sharing pattern can designate a condition in which each device may serve as the "host" device. For example, the sharing pattern may indicate that the device with the highest power level may serve as the "host" device until the device is no longer the device with the highest power level in the group. As such, once the condition such that the "host" device being the device with the highest power level is no longer satisfied, one of devices 105-120 or server 130 may identify the device currently with the highest power level and specify that device as the "host" device.

II. Flow Overview

As described, some embodiments enable the creation of a local ad hoc network for a group of electronic devices in order to facilitate data sharing. By permitting fewer devices than the entire group of devices to obtain the desired information, total power consumption as a group can be reduced. Each of the devices in the group may obtain the same information on the device without having to individually access a remote server or database. As described, the total power consumption can be greatly reduced when a single device in a group obtains the GPS data for the current location and shares the data with the remaining members of the group. As the group is within a reasonable proximity of each other, the location information of one of the group members would be sufficiently accurate. By having the devices take turns in obtaining the location information, the battery drain can be split among the devices within the group.

Figure 2:
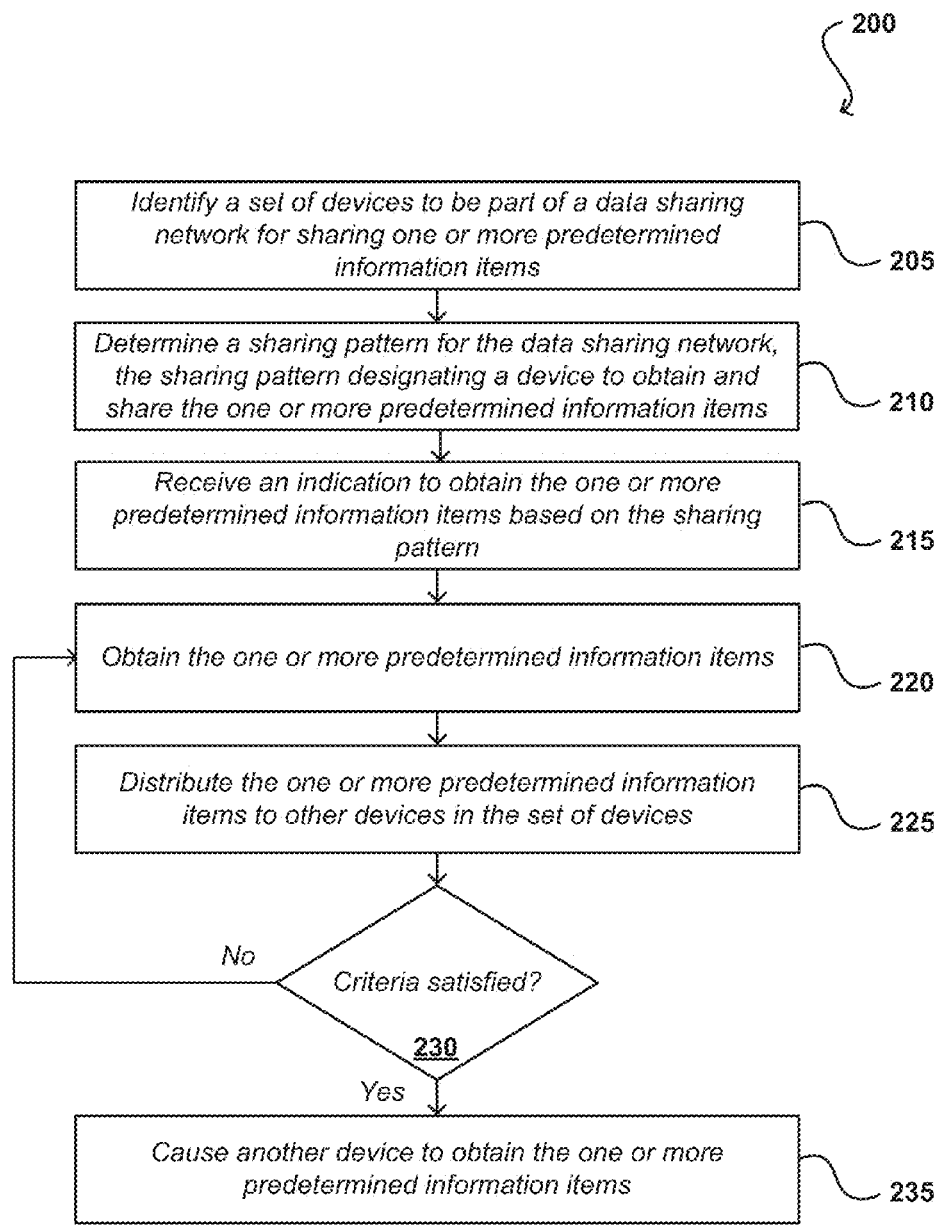
FIG. 2 is a flow chart of illustrative process of some embodiments for obtaining and distributing information to one or more devices in the group of devices.

FIG. 2 is a flow chart of illustrative process 200 of some embodiments for obtaining and distributing information to one or more devices in the group of devices. Process 200 can be performed by a single device (e.g., device 105 in FIG. 1), multiple devices (e.g., devices 105 and 110 in FIG. 1), a server device (e.g., device 130 in FIG. 1), or any suitable combination of devices. Process 200 can begin at block 205.

As shown at block 205, a set of devices can be identified to be part of a local network (also referred to as the data sharing network) for sharing one or more predetermined information items. In some embodiments, the set of devices can be identified by one or more devices in the set of devices. For example, one or more users of the devices can designate the devices to be included in the data sharing network through, for example, a user interface presented on the devices. A list of devices within the vicinity of a device may be detected and populated for presentation to a user of the device such that the user may identify which devices to include in the local network The set of devices can also be automatically identified by one of the devices when the device determines that the devices are obtaining a same type of information (e.g., weather information, location information, etc.). The set of devices can be within a short distance range of each other to permit communication via a low power consumption channel.

At block 210, a sharing pattern for the data sharing network can be determined. The sharing pattern can designate the pattern in which various devices in the network may serve as "host" in obtaining and disseminating the one or more predetermined information items. The sharing pattern can be determined based on use specification through a user interface. The user may specify the pattern in which the devices in the network obtain and distribute the information. For example, the use may specify a round robin manner in which the devices in the network may rotate in acting as "host" device. In another example, the user may specify a time period (e.g., 5 minutes, 10 minutes) in which the various devices may serve as "host." As described, the sharing pattern can designate a set period of time for the device to obtain and distribute the information items to the other devices in the group. The sharing pattern can further designate the next device (and subsequent devices) that obtains and distributes the information items to the rest of the devices in the group upon expiry of the set period of time.

In some embodiments, the sharing pattern can be determined based on specifications of the devices in the network. For example, the sharing pattern can designate a subset of devices that have GPS capabilities to take turns serving as the "host" device. A data sharing server or a device involved in setting up the data sharing session may receive the processing capabilities, hardware capabilities, networking capabilities, etc, of the various devices in the network and determine the sharing pattern based on this information.

In some embodiments, the sharing pattern can be determined based on a set of criteria. For example, the sharing pattern may designate for the "host" device (the device that obtains and distributes the information item(s)) to be changed when a set of criteria has been satisfied. For example, the sharing pattern may designate such that the device in the group that has the highest power level or the best signal strength to serve as the "host" device. In another example, the sharing pattern may designate that the top three devices with the best power level or signal strength to take turns serving as the "host" device. In yet another example, the sharing pattern may designate that a periodic determination may be made as to which devices have the best power level or signal strength and designate the device that satisfies such criteria to be the new "host" device for a time period.

The sharing pattern in some embodiments can further designate the type of information that will be obtained and shared amongst the group of devices. In some embodiments, multiple types of information can be obtained and shared. The sharing pattern may specify a frequency for the different types of information to be Obtained and the devices designated to obtain the different types of information for distribution. The one or more information items to be obtained by the various devices may be predetermined by one or more users of devices that are part of the local network, prior to creation of the local network. The local network connection may also be specified by the sharing pattern. The networking capabilities of the various devices may be determined prior to determining the local network connection for the shared session. Based on the networking capabilities of the devices, a local network connection that can be stable and power conserving may be identified to be used in the shared session for communication between the devices.

In some embodiments, a sharing session may be initiated (e.g., by a "host" device) upon determination of the devices participating in the sharing session and the sharing pattern for the sharing session. The sharing pattern (also referred to as a sharing plan) may be disseminated to the various devices for the sharing session. Network access for the sharing session may be granted to the various devices by one or more of the participating devices. In some embodiments, an access code may be sent to the various devices such that the various devices may join the sharing session as participants. The initiation of the sharing session and/or the sending of the access code may be performed by a single device initiating the sharing session via a user interface on the device or by a server. In some embodiments, the devices may receive a request to be coupled to the local network. The sharing session may then be created when the various devices have agreed to participate in the sharing session.

The devices to be included as part of the sharing session can be specified by one or more of the users initiating the sharing session prior to commencement of the sharing session. Some embodiments allow one or more users within the network to include additional devices after the shared session begins. However, devices not specified as being part of the local network may not automatically detect and connect to the network and obtain information from the various devices within the network.

At block 215, an indication to obtain the one or more predetermined information items can be received based on the sharing pattern. As described, the sharing pattern may be a protocol shared among the devices that can indicate which devices would perform the "host" functions and at what time intervals in some embodiments. One of the devices within the group may receive the indication to obtain the predetermined information item(s) as specified by the sharing pattern.

At block 220, one or more predetermined information items can be obtained. In some embodiments, the one or more information items can be obtained from an external source. As described, the device designated to obtain the information items (also referred to as the "host" device) can access a remote server (e.g., an app server or a Web server) remote storage outside of the devices in the local network to obtain the predetermined information item(s). In response to receiving the indication to obtain the predetermined information item(s), the device may obtain the predetermined information item(s). In some embodiments, since the data being obtained and distributed is predetermined information item(s), the "host" device obtaining the information in the data sharing system or service for a time period may not simply serve as conduit for devices within the network to request other types of information.

In some embodiments, multiple devices may be designated to obtain either the same type of predetermined information item or complementary predetermined information items such that a combination of the obtained information can produce higher accuracy. For example, multiple devices may obtain location information and one of the devices may gather the data to perform a comparison or cross-correlation to derive more accurate location information.

At block 225, the one or more predetermined information items can be distributed to other devices in the group of devices. In some embodiments, the device obtaining the one or more predetermined information items can distribute the obtained information in response to receiving the information, for example, from a remote server. The predetermined information item(s) can be distributed to the other devices in the group via a low power consumption channel as specified in the sharing pattern. For example, the "host" device can distribute the gathered information to the various devices in the group via a Bluetooth® connection. As such, the various devices may receive the pertinent information without having to retrieve the information from a remote server while using power-costly networking technologies.

At block 230, a determination can be made as to whether a criteria has been satisfied. As described, a sharing pattern can specify for an alternating "host" device based on a criteria. For example, the device currently obtaining and distributing the information can send a signal to another device within the group to notify the other device that the other device may perform the "host" functions when a set of criteria has been satisfied. In some embodiments, the criteria can be a passage of a time interval, a power level of a device meeting a threshold, a reception signal of a device meeting a threshold value, etc. If the sharing pattern specified for the criteria or condition to be met before a switch in the roles occur, the device designated to perform the "host" functions may be triggered to operate as the "host" when the condition has been met.

As shown at block 235, if the set of criteria has been determined to be satisfied, a device in some embodiments can cause another device to obtain the one or more predetermined information items. The other device can be a device specified by the sharing pattern to be the next device to perform the "host" functions. The device (or a server) can cause the other device to obtain the predetermined information items by sending a triggering signal to the other device. In some embodiments, the device need not cause another device (or send a signal to the other device) to begin obtaining and distributing the information item(s). Based on the sharing pattern, the other device may automatically begin its "host" duties when the set of criteria has been determined to be satisfied.

If the set of criteria has been determined to not be satisfied, process 200 can return to block 220 to obtain one or more predetermined information items. In some embodiments, the device designated to obtain and distribute the information item(s) can periodically retrieve the information from the outside source. The device may then periodically distribute the information to the other devices in the shared session. In some embodiments, the device may distribute the information in response to receiving the information. Whether the set of criteria has been satisfied may be determined periodically in some embodiments. In some embodiments, the sharing pattern designates a certain time interval for each device to perform the "host" functions and as such, does not require the devices to periodically determine whether the criteria has been satisfied. The device may send a signal to the next device upon expiry of the time interval or the other device may simply begin it's "host" duties upon reaching the appropriate time interval.

Some or all of process 200 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program to be executed by processing unit(s), such as a browser application. The computer-readable storage medium may be non-transitory.

III. Setup and Initiation of a Data Sharing Session

The data sharing network can be created for a group of people who have come within a range of each other. In some embodiments, a user of a mobile device can configure a data sharing network via a user interface provided by a data sharing application or data sharing Web service. The data sharing application of some embodiments can allow the user to specify participant devices for a data sharing session, along with parameters and sharing patterns for the data sharing session.

FIG. 3 illustrates an example of a setup and initiation sequence 300 of a data sharing session through a user interface provided by a data sharing application in accordance with some embodiments. FIG. 3 illustrates four stages 305-320 of GUI 300 of client device 320 (e.g., client device 105-120 in FIG. 1) for setting up and initiating the data sharing sequence. GUI 300 includes a display area 325 for displaying configurable settings in setting up a data sharing session. While in some embodiments, a data sharing application can be launched for GUI 300 to be presented to a user of the device, some embodiments permit the user to configure a data sharing session through a preference setting of the device.

As shown in the first stage 305, GUI 300 includes a display area 325 for displaying a set of detected devices. Upon launching a data sharing application, the mobile device can detect one or more devices within a range of the mobile device. The range may be defined by a boundary reachable via a low consumption channel. In some embodiments, the range may be a threshold distance defined by a user or an administrator. The data sharing application or service can detect one or more devices within a range or threshold distance of the mobile device e.g., detected via GPS, via GSM localization) and present those devices to the user. The user may then select one or more devices within the list of devices to include as participant devices for the data sharing session.

In some embodiments, instead of detecting one or more devices within a threshold distance of the mobile device, the application (or the service) presents a list of devices that may be of interest to the user. The list may be populated from an address book stored on the device or a contacts list of the user across various applications and services. The user may identify the group of devices for the data sharing session before the devices come within range of each other. As such, the mobile device can detect those devices when the devices fall within a range of the mobile device and begin the data sharing session.

As shown in stage 305, a number of devices 326-329 have been selected (as indicated by the highlighted and bolded selectable items) to be part of the data sharing session after the devices have been detected or identified. Although a larger group of devices have been detected and/or identified by the mobile device, only a subset of those devices may be selected by the user to be part of the data sharing session. After the data sharing network has been configured, access to the local sharing network can be given to the selected devices.

In stage 310, one or more predetermined information items can be identified by the user as the information to be retrieved by the host and distributed to the other devices in the group. In some embodiments, the mobile device can present a list 330 of predetermined information items from which the user can select as the object for sharing. As shown in this example, the user has selected location selectable item 335 to be the information item to be retrieved by a device and distributed to the other devices in the group. The user may also edit a frequency at which the predetermined information item may be collected from the server by selecting selectable item 340, The predetermined information item(s) to be obtained and distributed can be part of a sharing pattern that specifies the tasks to be performed by the "host." In some embodiments, the sharing pattern may further identify a frequency in which the task may be performed and the manner in which it is performed (e.g., periodically). For example, the sharing pattern may specify that the "host" can obtain the information item(s) every 5 seconds. The sharing pattern in some embodiments may also designate the frequency at which the "host" device can distribute the item(s) to other devices within the group.

In stage 315, a sharing pattern can be configured by a user of the mobile device. In some embodiments, the sharing pattern can specify the participant devices that may serve as a "host" role. The user may select the devices within the group of devices that may serve as a "host" device (also referred to as "master" device or "master" participant). In some embodiments, the mobile device (or a server) may determine hardware capabilities of each participant device, the networking capabilities, the resources available or accessible to the device, etc. As such, the capabilities of each device may be determined and presented to the user such that the user may select the appropriate devices to serve as "host" devices.

As shown in stage 315, a set of hardware and networking capabilities are presented next to each participant device. The devices with the capabilities appropriate for the current task have been selected by the user, as indicated by the selection 342-346. In this instance, the devices with GPS components and Bluetooth® capabilities have been identified to be "host" appropriate and selected by the user. The user may for various reasons (e.g., a device may have much lower power level) decide not to include one or more devices to serve as a potential "host." In some embodiments, a data sharing application may automatically exclude those without the appropriate capabilities from being a "host" device without requiring manual identification by the user.

Some of the participant devices may only receive information item(s) from one or more devices serving as a "host" device throughout the data sharing session. Depending on the capabilities of each device, some embodiments may determine that it may be inappropriate for certain devices within the group to serve as a "host" device. For example, a tablet computer with limited networking capabilities and limited hardware may be identified as in appropriate for serving as a "host" device where it would be necessary to retrieve data from an external source or server. In some embodiments, the default setting is for every device in the group to participate as a "host" device at certain times throughout the sharing session.

In some embodiments, the sharing pattern may further specify the set of criteria or condition that needs to be satisfied for the "host" role to be alternated among the various devices. As shown in stage 320, the display area presents the conditions to be satisfied for each device to alternate as the "host" and permits the user to configure the condition(s) upon selection. The conditions or set of criteria available for selection in this example include a time interval set for each "host" device, the device with the highest power level, the device with the best signal level, the device that has a rechargeable source connected to it. Different embodiments may include a different set of criteria or conditions that may trigger a "host" device switch. In this example, the user has selected for the devices to alternate when a set time period has passed, as indicated by the selection of selectable item 348. The time limited indicated by the user is 5 minutes.

After the information item(s), the devices for performing the item retrieval and distribution, and the sharing pattern have been identified (e.g., by the user), the data sharing session can be created. In this example, the user can select a user selectable interface item 350 to create the data sharing session. Different embodiments may allow the user to designate and configure additional settings for the data sharing session. For example, some embodiments may permit the user to designate an action for devices that fall out of the local network range of the data sharing network. In such a situation, the data sharing application may designate those devices to obtain the predetermined information item(s) after failing to detect a signal from the current "host" device beyond a threshold period of time.

In some embodiments, after the data sharing session is created, the sharing pattern can be forwarded to the various devices in the group. As such, each device may be aware of the sharing pattern for the data sharing session and perform their respective roles as specified by the sharing pattern for the data sharing session. Although in this example, only one user is shown to have been configuring the data sharing pattern for the data sharing session, some embodiments enable multiple devices to log into the application or service and configure various aspects about the data sharing session. Further, the application may enable the user to specify which service or application (e.g., a map application) for which the shared data would be used.

IV. Sequence Chart for a Data Sharing Session

Prior to establishing the shared session, a device can identify one or more devices that may want to participate in a data sharing session of a shared service. As described, the shared service can be obtaining location, obtaining a frequency for a network connection, obtaining weather condition, or any information that can be obtained on a periodic basis while serving as a meaningful piece of information (e.g., not a piece of music where periodic retrieval may not be meaningful or useful to a user). The data sharing network can be created for sharing one or more predetermined information items that can be retrieved by one or more devices on a periodic basis. As described, the sharing pattern may also be identified prior to establishing the shared session, where the sharing pattern includes a protocol for identify the device(s) for performing the data retrieval from a remote server and/or database and/or the time intervals for such performance.

In some embodiments, the sharing pattern can identify the devices that would like to receive the information item(s) distributed by the "host" device(s). Based on the sharing pattern, one or more devices can receive the information item(s) from the "host" device. In some embodiments, the devices within the local ad hoc network may communicate via a Bluetooth® network or any other low consumption channel. Upon establishing the data sharing session, the various devices in the data sharing network can obtain data from a server (e.g., a data sharing server, a remote app server) and distribute the data in accordance with the data sharing pattern (also referred to as the data sharing protocol).

Figure 4:
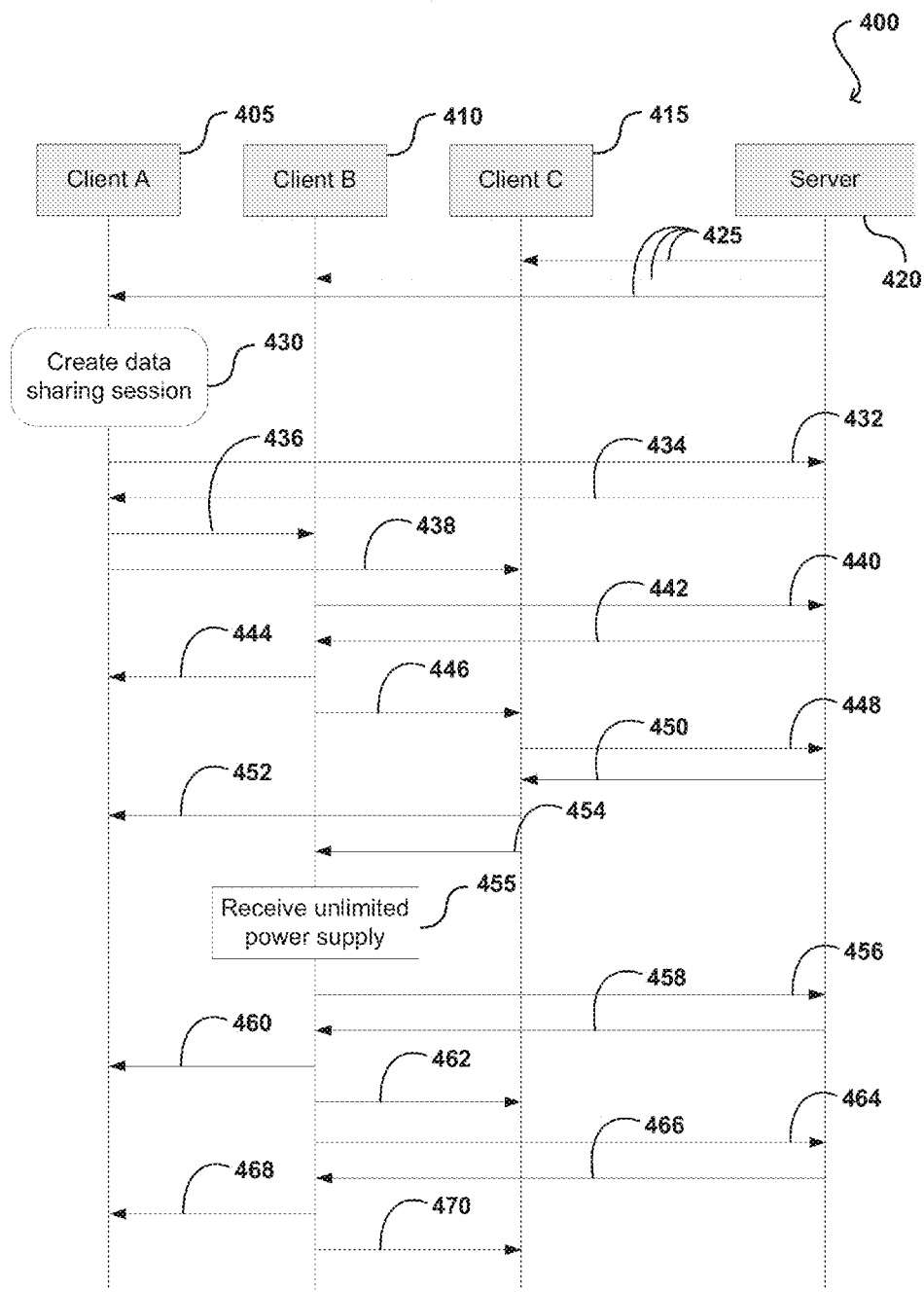
FIG. 4 is a sequence chart illustrative of process of some embodiments for collaborative data retrieval and sharing among a group of devices in a data sharing session.

FIG. 4 is a sequence chart illustrative of process 400 of some embodiments for collaborative data retrieval and sharing among a group of devices in a data sharing session. In this example, the data to be retrieved is location information to be used in conjunction with a map application. Here, remote server 420 (e.g., data sharing server) may be serving data to each of clients A 405, B 410, and C 415, at 425. Each client device can typically retrieve the desired data by accessing remote server 420 using its own resources and capabilities. The server may then send the requested information to the client devices in response to receiving the request.

At least one of the client devices can initiate a data sharing session (e.g., using a data sharing application or a data sharing service) and identify the devices to be included in the data sharing network. As shown at 430 in this example, client device A can create a data sharing session by identifying client devices B and C 410 and 415 as participants of the data sharing network. Client device A 405 or any other participant of the data sharing system (or the data sharing server) may determine the communication network to be used for the local network. In this example, client device A 405 can select Bluetooth® communication network to be the networking technology for the data sharing session. As described, in some embodiments, server device 420 can determine participants of a shared session based on an application running on each device within a range of each other and the information being requested by the devices.

As described, the data sharing session can be initiated upon designating the predetermined information item(s) to be shared during the sharing session and the sharing pattern among the various participants of the data sharing network. The predetermined information item(s) can be identified by one or more participants. In this instance, the predetermined information item can be location information that can be used as part of a map application in guiding the users to a destination location. In some embodiments, the server can automatically determine the predetermined information item(s) based on the commonality in the items being requested by the devices with the group.

The sharing pattern can be identified by one or more participants, or a server in some embodiments. The sharing pattern can designate the devices that may perform the data collection and distribution and the time intervals at which a particular device may perform the task. In some embodiments, the sharing pattern can be dynamically determined based on a set of criteria or conditions. For example, the sharing pattern may specify a protocol that designates a device with the highest power level to be the "host" device or the device performing the data collections (in some instances, to perform data collection for the period of time at which the device remains as the device with the highest power level). In another example, the sharing pattern can designate that the device with the best signal reception or the device that is connected to a power source (mounted to a car charger in a car) to be the data collector. One or more devices within the network can perform periodic polling to determine whether the condition is still satisfied. When a device determines that the condition is no longer satisfied (e.g., the device collecting the data is no longer the device with the highest power level), then another device may be dynamically chosen as the next data collector (or "host" device).

The sharing pattern can also be determined based on hardware capacities and/or networking capacities of the devices in the data sharing network. For instance, the sharing pattern may designate only a subset to perform the data collection if only those devices possess GPS components on the device, in another instance, the sharing pattern may designate one or more devices to perform the data collection if those devices can communicate through the 3G network to obtain the desired information. In some embodiments, multiple predetermined information items can be identified for the session, with a different sharing pattern. That is, multiple devices may be designated to obtain one or more predetermined information items for sharing and different devices may obtain the different types of information, at a different frequency.

To participate in the data sharing session, client device A 405 may present a network passcode to the various participants such that the participants may join the session using the passcode. In some embodiments, client devices B 410 and C 415 may present a unique identifier for identifying the respective devices, parameter or specifications of the devices, along with information for establishing a communication with the various participants in the data sharing session. The data sharing session may then be created.

The devices may start collecting information from the server and sharing the information in a manner according to a protocol specified by the sharing pattern. At 432, client device A 405 sends a request to server 420 for the predetermined information item (i.e., a current location). At 434, client device A 405 receives the requested information from server 420. At 436 and 438, client device A 405 sends the obtained information to client devices B and C 410 and 415, respectively.

While in this example, it only shows that client device A 405 collects the data and distributes the data for one round, in different examples, client device A 405 may collect the information for several more rounds before the task is rotated to another device. Further, while it is shown that a request for the information has been sent to remote server 420 in order to collect the desired information, in some embodiments, the "host" device or client A 405 in this example, can serve as the device that receives push notifications or information without requiring the client device to request the device. Upon receiving the push notification or information, client device A 405 may then distribute the information to other participant devices 410 and 415.

At 440, client device B 410 may send a request to server 420 for the predetermined information item. At 442, sever 420 send the requested information back to client device B 410. Client device B 410 may then distribute the information to client device A 405 and client device C 415 at 444 and 446, respectively. The order of distribution may vary and in some instances the information may be sent to devices A 405 and C 415 at the same time. In some embodiments, the information is broadcasted to remaining devices in the shared network such that the devices receive the information virtually simultaneously. Again, client device B 410 may request the information on a periodic basis for a number of times as specified by the sharing pattern, although in this example, client device B 410 is shown to only collect the information for one round before the task is passed onto client device C 415.

At 448, client device C 415 sends a request to server 420 for the predetermined information item. At 450, client device C 415 receives the request information item from server 420 and proceeds to distribute the information item to client devices A 405 and B 410 at 452 and 454, respectively.

At block 455, client B 410 receives unlimited power supply by being plugged into a power outlet or being mounted on a charging station, or has more battery power than the other devices. In this example, the sharing pattern includes a protocol that designates devices hooked up to an unlimited power supply can perform the data collection (or "host" duties) until a power supply is no longer connected to the device. As such, client device B 410 subsequently performs the data collection and requests the predetermined information item from server device 420 at 456, receives the information item at 458 and distributes the information item to other devices in the network at 460 and 462. This pattern can continue until the condition is no longer satisfied. One or more devices within the network may periodically poll the devices in the network to ensure that the condition is still satisfied. When the condition has been determined to be no longer satisfied, another device may be dynamically determined (either by one of the participant devices or by the data sharing server) to serve as the data collector or "host" device.

As described, some embodiments enable a user to pre-specify a sharing pattern for the sharing session where the sharing pattern can be determined based on a set of conditions. Another example of a condition can be whether a device has full charge in power level or whether a device is connected to a power source (e.g., connected to a power outlet or a car charger). If the condition is satisfied, the sharing pattern may designate that the device satisfying the condition to serve as the "host" device, until the condition is no longer satisfied. As such, a device hooked up to the car charger may perform the data obtaining and send the data to the various devices in the car that are not hooked up to a car charger.

In some instances, the "host" device may periodically ping the server to request the desired information item(s) (e.g., a location information) but not receive a response in return. For example, the device may attempt to scan for a signal or frequency but not obtain the desired information. When the set of criteria is satisfied (e.g., the time period for which this device serves as "host"), another device in the group may pick up the task, despite the original device not being able to obtain the desired information. If the device does obtain the desired information, the device may share the obtained information by distributing the information through the ad hoc network (e.g., via a "push" mechanism).

V. Device Management in a Data Sharing Network

Initiating and establishing a data sharing session allows the devices to collaborate in obtaining and sharing data while reducing overall power consumption as a group. Based on the sharing pattern, different devices in the group of devices may be obtaining and distributing predetermined data to remaining members within the group at different times throughout the data sharing session. Some devices may fall out of the pre-established local network range (also referred to as the data sharing network) throughout the data sharing session. In some embodiments, devices that fall out of the range of the data sharing network may be prompted to obtain their own data.

Figure 5:
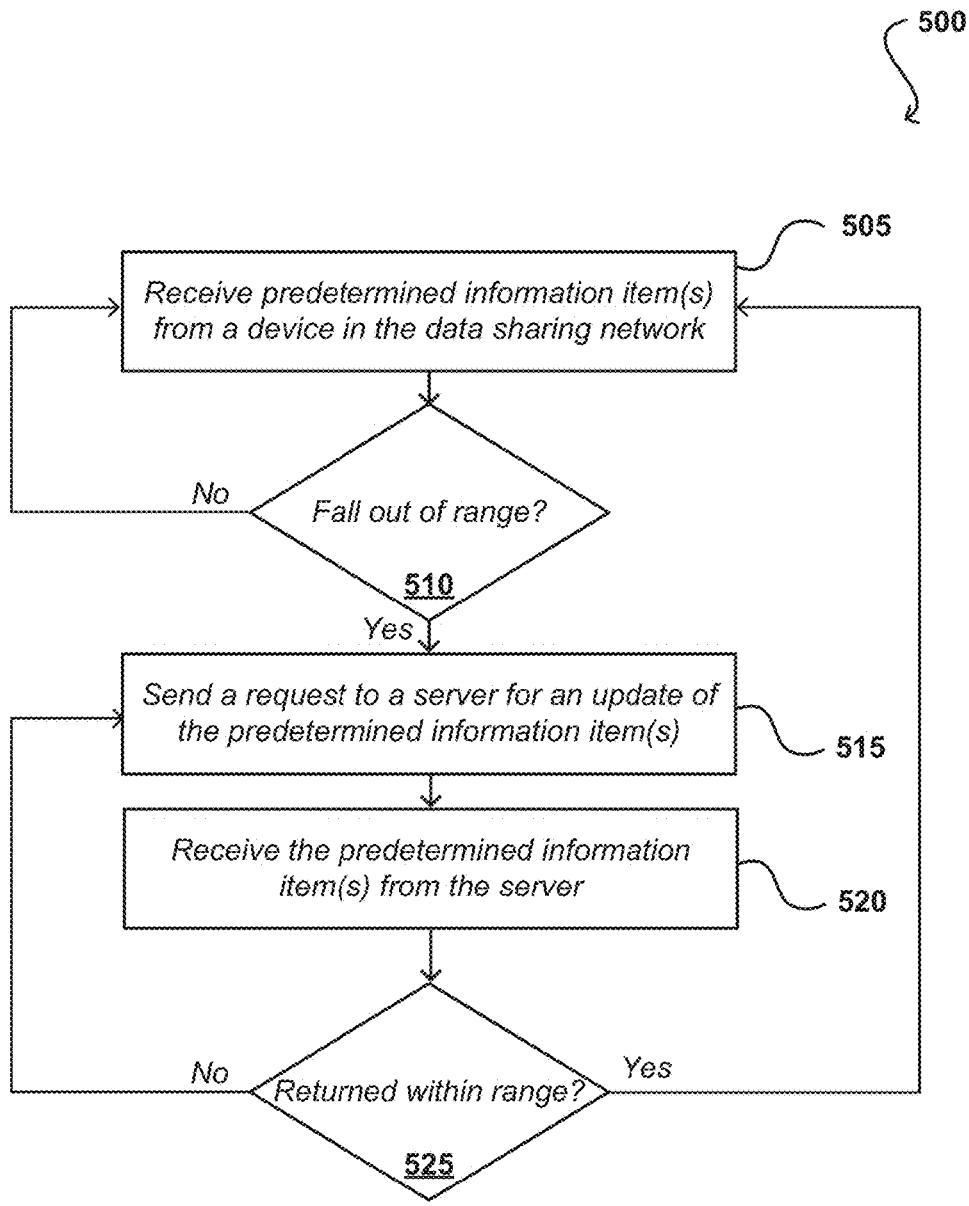
FIG. 5 is a flow chart of illustrative process of some embodiments for obtaining predetermined information item(s) when a device falls out of the data sharing network range.

FIG. 5 is a flow chart of illustrative process 500 of some embodiments for obtaining predetermined information item(s) when a device falls out of the data sharing network range. In some embodiments, a data sharing pattern may establish a protocol designating for devices fallen out of network range (i.e., are unable to detect the "host" device performing the data obtaining and distribution beyond a threshold period of time) to obtain the data from the outside source using their own resources. In response to detecting a loss of connection with the device collecting the data (i.e., the "host" device), the device may start collecting the data itself. Process 500 can begin at block 505.

At block 505, one or more predetermined information items can be received from a device in the data sharing network. Devices within the shared data network that are not actively obtaining data from an outside source and distributing the data to other devices within the network are "passive" devices. The "passive" devices may receive the predetermined information items from the "active" devices during the data sharing session via, e.g., the Bluetooth® network or any other low consumption channel. As described the network through which the devices are connected and transmit and receive information can be pre-established. prior to establishing the data sharing session. In some embodiments, the type of network can be determined based on capabilities (e.g., hardware capability, networking capability) of devices within the data sharing network.

At block 510, a determination can be made as to whether the "passive" device has fallen out of the local network range. The "passive" device can determine whether it is connected to the wireless network as designated by the data sharing session. In the instance where a group of people are on a hiking trip, one or more people may become far ahead or behind the group and thereby fall out of the data sharing network. The device can determine whether it is still within the network range using various methods well known by one of ordinary skill in the art. In some embodiments, the device can determine that it has fallen out of the network range by failing to detect one or more devices within the shared session. The device in some embodiments can determine that it has fallen out of the network range by pinging the "host" device and failing to receive a response signal from the "host" device for more than a period of time.

At block 515, a request for one or more predetermined information items (e.g., an update of the items received in block 505) can be sent to an outside source (e.g., a server). The pre-established data sharing pattern can indicate that a device that falls out of range may obtain the information item(s) for the out-of-network time period. The device may send a request to a remote server (and/or remote storage) for the desired information item(s) using other more energy consuming networking technologies (e.g., 3G, GSM, WiFi). Until the shared network is detected, the device may request the information item(s) using its own resources (e.g., hardware resources, network resources on the device).

At block 520, the one or more predetermined information items can be received from the outside source. The "passive" device can receive the information item(s) requested from a remote server, which can send the desired information item(s) to the device in response to receiving the request for the information item(s). Upon receiving the desired predetermined information item(s), the device can present the information to the user. In the example previously mentioned, the user may then view the current location and directional information while the user is on a hike toward a destination.

At block 525, a determination can be made as to whether the device has returned within the local network range. In some embodiments, the "passive" device can determine that it has returned within range by detecting the "host" device or by detecting the network itself. If a determination that the device has returned within the network range, process 500 can return to block 505 and receive the one or more predetermined information items from a "host" device in the data sharing network.

If a determination that the device has not returned within the network range, process 500 can return to block 515 and continue to send a request for the predetermined information item(s). The device can continue to obtain the desired information items using its own resources until it returns within the data sharing network range. In some embodiments, the device can obtain the predetermined information item on a periodic basis. The device in some embodiments may check whether it has returned within the network range less frequently than its obtaining the desired information.

VI. Mobile Device and Server

FIG. 6A is a simplified block diagram of an implementation of a device 600 according to an embodiment of the present invention. Device 600 can be a mobile device, a handheld device, a notebook computer, a desktop computer, or any suitable electronic device with a screen for displaying images and that is capable of communicating with a server 650 (e.g., data sharing server) as described herein. Device 600 includes a processing subsystem 602, a storage subsystem 604, a user input device 606, a user output device 908, a network interface 610, and a location/motion detector 612.

Processing subsystem 602, which can be implemented as one or more integrated circuits (e.g., e.g., one or more single-core or multi-core microprocessors or microcontrollers), can control the operation of device 600. In various embodiments, processing subsystem 602 can execute a variety of programs in response to program code and can maintain multiple concurrently executing programs or processes. At any given time, some or all of the program code to be executed can be resident in processing subsystem 602 and/or in storage subsystem 604.

Through suitable programming, processing subsystem 602 can provide various functionality for device 600. For example, processing subsystem 602 can execute a data sharing application program (or "app") 616. Data sharing app 616 can perform all or parts of methods described herein, such as determining a data sharing pattern for two or more devices participating in a data sharing session. Data sharing app 616 on one or more devices can enable the devices to take turns in obtaining and distributing information items, as designated by the data sharing pattern. In some embodiments, instead of using data sharing app 616 to perform the various methods as described herein, a data sharing service provided by a data sharing server (e.g., server 650) can allow one or more devices to obtain a designated piece of information item and distribute the information item to various devices within a shared session. The designated piece of information item can be a piece of information collected or received by a device on a periodic basis, such as location information, weather condition or alerts, frequency of connection, etc.

Storage subsystem 604 can be implemented, e.g., using disk, flash memory, or any other storage media in any combination, and can include volatile and/or non-volatile storage as desired. In some embodiments, storage subsystem 604 can store one or more application programs to be executed by processing subsystem 602 (e.g., app 616). In some embodiments, storage subsystem 604 can store other data (e.g., used by and/or defined by app 616). Programs and/or data can be stored in non-volatile storage and copied in whole or in part to volatile working memory during program execution.

A user interface can be provided by one or more user input devices 606 and one or more user output devices 608. User input devices 606 can include a touch pad, touch screen, scroll wheel, click wheel, dial, button, switch, keypad, microphone, or the like. User output devices 608 can include a video screen, indicator lights, speakers, headphone jacks, or the like, together with supporting electronics (e.g., digital-to-analog or analog-to-digital converters, signal processors, or the like). A customer can operate input devices 606 to invoke the functionality of device 600 and can view and/or hear output from device 600 via output devices 608.

Network interface 610 can provide voice and/or data communication capability for device 600. For example, network interface 610 can provide device 600 with the capability of communicating with server 650. In some embodiments network interface 610 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), and/or other components. In some embodiments network interface 610 can provide wired network connectivity (e.g., Ethernet) in addition to or instead of a wireless interface. Network interface 610 can be implemented using a combination of hardware (e.g., antennas, modulators/demodulators, encoders/decoders, and other analog and/or digital signal processing circuits) and software components.

Location/motion detector 612 can detect a past, current or future location of device 600 and/or a past, current or future motion of device 600. For example, location/motion detector 612 can detect a velocity or acceleration of mobile electronic device 600. Location/motion detector 612 can comprise a Global Positioning Satellite (GPS) receiver and/or an accelerometer. In some instances, processing subsystem 602 determines a motion characteristic of device 600 (e.g., velocity) based on data collected by location/motion detector 612. For example, a velocity can be estimated by determining a distance between two detected locations and dividing the distance by a time difference between the detections.

FIG. 6B is a simplified block diagram of an implementation of server 650 according to an embodiment of the present invention. Server 650 may be used for any server mentioned herein. Server 650 includes a processing subsystem 652, storage subsystem 654, a user input device 656, a user output device 658, and a network interface 660. Network interface 660 can have similar or identical features as network interface 610 of device 600 described above.

Processing subsystem 652, which can be implemented as one or more integrated circuits (e.g., a conventional microprocessor or microcontroller), can control the operation of server 650. In various embodiments, processing subsystem 652 can execute a variety of programs in response to program code and can maintain multiple concurrently executing programs or processes. At any given time, some or all of the program code to be executed can be resident in processing subsystem 652 and/or in storage subsystem 654. Through suitable programming, processing subsystem 652 can provide various functionality for server 650. Thus, server 650 can interact with app 616 being executed on device 600 in order to provide information item(s) to device 600.

Storage subsystem 654 can be implemented, e.g., using disk, flash memory, or any other storage media in any combination, and can include volatile and/or non-volatile storage as desired. In some embodiments, storage subsystem 654 can store one or more application programs to be executed by processing subsystem 652. For example, an application program 676 can interface with app 616 to respond to requests for information. In some embodiments, storage subsystem 654 can store other data, such as data sharing patterns, device identifiers, and specifications and capabilities of devices. Programs and/or data can be stored in non-volatile storage and copied in whole or in part to volatile working memory during program execution.

A user interface can be provided by one or more user input devices 656 and one or more user output devices 658. User input and output devices 656 and 658 can be similar or identical to user input and output devices 606 and 608 of device 600 described above. In some instances, user input and output devices 656 and 658 are configured to allow a programmer to interact with server 650. In some instances, server 650 can be implemented at a server farm, and the user interface need not be local to the servers.

It will be appreciated that device 600 and server 650 described herein are illustrative and that variations and modifications are possible. A device can be implemented as a mobile electronic device and can have other capabilities not specifically described herein (e.g., telephonic capabilities, power management, accessory connectivity, etc.) in a system with multiple devices 600 and/or multiple servers 650, different devices 600 and/or servers 650 can have different sets of capabilities; the various devices 600 and/or servers 650 can be but need not be similar or identical to each other.

Further, while device 600 and server 650 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while device 600 and server 650 are described as singular entities, it is to be understood that each can include multiple coupled entities. For example, server 650 can include, a server, a set of coupled servers, a computer and/or a set of coupled computers.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method comprising:
   identifying, by a first device in a plurality of devices, the plurality of devices to be part of a local network for sharing one or more predetermined information items;
   receiving a selection of the one or more predetermined information items;
   determining a requirement specific to being able to provide the one or more predetermined information items, wherein the requirement includes providing a location;
   determining a set of hardware and networking capabilities for each of the plurality of devices;
   identifying, by the first device, a subset of the plurality of devices that are potential hosts based on whether the set of hardware and networking capabilities for each of the plurality of devices meets the requirement specific to being able to provide the one or more predetermined information items, the subset of the plurality of devices including the first device;
   determining a sharing pattern for the local network, the sharing pattern designating a particular device from the subset of the plurality of devices to obtain and share the one or more predetermined information items with other devices in the plurality of devices for a first period of time, the sharing pattern further designating another device from the subset of devices to obtain and share the one or more predetermined information items when one or more criteria is satisfied;
   receiving, at the first device, an indication to obtain the one or more predetermined information items for the plurality of devices for the first period of time, the indication being based on the sharing pattern;
   obtaining, by the first device, the one or more predetermined information items for the plurality of devices for the first period of time;
   distributing, by the first device, the one or more predetermined information items to the other devices in the plurality of devices;
   determining, based on a periodic polling of the subset of devices, that a second device satisfies the one or more criteria, wherein the subset of devices includes the second device; and
   notifying the second device to obtain the one or more predetermined information items for the plurality of devices.

2. The method of claim 1, wherein the one or more criteria is satisfied when power level of the second device has reached a threshold.

3. The method of claim 1, wherein the sharing pattern further designates the other device to obtain and share the one or more predetermined information items with other devices in the plurality of devices for a second period of time when the one or more criteria is satisfied.

4. The method of claim 1, further comprising:
   creating a data sharing session for the plurality of devices using the local network, wherein the plurality of devices communicate with each other via the local network.

5. The method of claim 1, wherein the one or more predetermined information items includes at least one of a location, a weather condition, a frequency, or a time.

6. The method of claim 1, wherein the sharing pattern is determined based on at least one of a battery life of the plurality of devices, a network connectivity of the plurality of devices, or hardware capability of the plurality of devices.

7. The method of claim 1, wherein the one or more predetermined information items is obtained on a periodic basis.

8. The method of claim 3, further comprising:
   sharing the sharing pattern for the local network with the other devices in the plurality of devices; and
   causing, based on the sharing pattern, the other device in the plurality of devices to obtain the one or more predetermined information items for the second period of time after the first period of time.

9. An electronic device comprising:
   a processor;
   a memory device coupled to the processor, the memory device including instructions to be executed, wherein the instructions, when executed by the processor, cause the processor to:
      identify a plurality of devices to be part of a local network for sharing one or more predetermined information items;
      receive a selection of the one or more predetermined information items;
      determine a requirement specific to being able to provide the one or more predetermined information items, wherein the requirement includes providing a location;
      determine a set of hardware and networking capabilities for each of the plurality of devices;

identify a subset of the plurality of devices that are potential hosts based on whether the set of hardware and networking capabilities for each of the plurality of devices meetings the requirement specific to being able to provide the one or more predetermined information items, the subset of the plurality of devices including the electronic device;

determine a sharing pattern for the local network, the sharing pattern designating a particular device from the subset of the plurality of devices to obtain and share the one or more predetermined information items with other devices in the plurality of devices for a first period of time, the sharing pattern further designating another device from the subset of devices to obtain and share the one or more predetermined information items when one or more criteria is satisfied;

receive an indication to obtain the one or more predetermined information items for the plurality of devices for the first period of time, the indication being based on the sharing pattern;

obtain the one or more predetermined information items for the plurality of devices for the first period of time;

distribute the one or more predetermined information items to the other devices in the plurality of devices;

determine, based on a periodic polling of the subset of devices, that a second device satisfies the one or more criteria, wherein the subset of devices includes the second device; and notify the second device to obtain the one or more predetermined information items for the plurality of devices.

10. The electronic device of claim 9, wherein the one or more criteria is satisfied when a power level of the second device has reached a threshold.

11. The electronic device of claim 9, wherein the sharing pattern further designates the other device to obtain and share the one or more predetermined information items with other devices in the plurality of devices for a second period of time when the one or more criteria is satisfied.

12. The electronic device of claim 9, wherein the instructions further cause the processor to:
create a data sharing session for the plurality of devices using the local network, wherein the plurality of devices communicate with each other via the local network.

13. The electronic device of claim 9, wherein the one or more predetermined information items includes at least one of a location, a weather condition, a frequency, or a time.

14. The electronic device of claim 9, wherein the sharing pattern is determined based on at least one of a battery life of the plurality of devices, a network connectivity of the plurality of devices, or hardware capability of the plurality of devices.

15. A computer product comprising a non-transitory computer readable medium storing a plurality of instructions that when executed cause a processor to perform a set of instructions, the set of instructions comprising:
identifying, by a first device in a plurality of devices, the plurality of devices to be part of a local network for sharing one or more predetermined information items;
presenting a plurality of information items on a graphical user interface of the first device;
receiving a selection of the one or more predetermined information items from the plurality of information items, wherein the one or more predetermined information items are identified prior to commencement of the local network;
determining a requirement specific to being able to provide the one or more predetermined information items, wherein the requirement includes providing a location;
determining a subset of devices from the plurality of devices that meet the requirement specific to being able to provide the one or more predetermined information items;
determining a sharing pattern for the local network, the sharing pattern designating a particular device from the subset of devices in the plurality of devices to obtain and share the one or more predetermined information items with other devices in the plurality of devices for a first period of time, the sharing pattern further designating another device from the subset of devices to obtain and share the one or more predetermined information items when one or more criteria is satisfied;
receiving, at the first device, an indication to obtain the one or more predetermined information items for the plurality of devices for the first period of time, the indication being based on the sharing pattern;
obtaining, by the first device, the one or more predetermined information items for the plurality of devices for the first period of time; and
distributing, by the first device, the one or more predetermined information items to the other devices in the plurality of devices.

16. The computer product of claim 15, wherein the one or more criteria is satisfied when the first period of time is over or when a power level of the first device has reached a threshold.

17. The computer product of claim 15, wherein the sharing pattern further designates the other device to obtain and share the one or more predetermined information items with other devices in the plurality of devices for a second period of time when the one or more criteria is satisfied.

18. The computer product of claim 15, wherein the set of instructions further comprises:
creating a data sharing session for the plurality of devices using the local network, wherein the plurality of device communicate with each other via the local network.

19. The computer product of claim 15, wherein the one or more predetermined information items includes at least one of a location, a weather condition, a frequency, or a time.

20. The method of claim 1, further comprising:
displaying the plurality of devices and the set of hardware and networking capabilities for each of the plurality of devices on a graphical user interface of the device; and
receiving, via the graphical user interface, a selection of the subset of the plurality of devices to be potential hosts, wherein the subset of the plurality of devices is identified based on the received selection.

21. The method of claim 1, further comprising:
specifying an order for the subset of devices to obtain the one or more predetermined information items; and
upon losing an ability to obtain the one or more predetermined information items, enabling, via the local network, a subsequent device according to the specified order to obtain the one or more predetermined information items.

22. The method of claim 1, further comprising:
receiving, by the first device and from a user, user configuration information for configuring a data sharing session among the plurality of devices, the configuration information specifying the subset of the plurality of devices that are potential hosts and the sharing pattern.

23. The method of claim 22, further comprising:
upon completing the configuring of the data sharing session, enabling the other devices in the plurality of devices access to the local network.

* * * * *